United States Patent
Brandenburg et al.

(10) Patent No.: US 11,534,965 B2
(45) Date of Patent: Dec. 27, 2022

(54) BINDER JETTING ADDITIVE MANUFACTURING FOR VENEER APPLICATIONS

(71) Applicant: Goodrich Corporation, Charlotte, NC (US)

(72) Inventors: Loren O. Brandenburg, Stafford Springs, CT (US); Joseph M. Tomashek, Naperville, IL (US); Nicholas W. Linck, LaGrange, KY (US); Christopher L. Chapman, Georgetown, IN (US); Brian K. Barnett, New Albany, IN (US); Ricardo O. Brown, West Hartford, CT (US); Shawn K. Reynolds, Byron, IL (US); Edward D. Thompson, Jeffersonville, IN (US)

(73) Assignee: Goodrich Corporation, Charlotte, NC (US)

( * ) Notice: Subject to any disclaimer, the term of this patent is extended or adjusted under 35 U.S.C. 154(b) by 97 days.

(21) Appl. No.: 16/717,057

(22) Filed: Dec. 17, 2019

(65) Prior Publication Data
US 2021/0178672 A1 Jun. 17, 2021

(51) Int. Cl.
*B29C 64/188* (2017.01)
*B29C 64/112* (2017.01)
(Continued)

(52) U.S. Cl.
CPC .......... *B29C 64/188* (2017.08); *B29C 64/112* (2017.08); *B29C 64/255* (2017.08); *B33Y 10/00* (2014.12)

(58) Field of Classification Search
CPC .... B29C 64/112; B29C 64/165; B29C 64/188
See application file for complete search history.

(56) References Cited

U.S. PATENT DOCUMENTS

| 4,465,539 A | 8/1984 | Saihara et al. |
| 7,795,349 B2 * | 9/2010 | Bredt .................... B29C 64/165 525/193 |

(Continued)

FOREIGN PATENT DOCUMENTS

| DE | 3200257 C2 | 7/1986 |
| EP | 1791683 B1 | 3/2013 |

(Continued)

OTHER PUBLICATIONS

Extended Search Report for European Application No. 20215195.7 dated Apr. 23, 2021, 7 pages.

*Primary Examiner* — Alex A Rolland
(74) *Attorney, Agent, or Firm* — Suiter Swantz pc llo (57) ABSTRACT

A method of binder jetting additive manufacturing for veneer applications may include, but is not limited to, loading a mixture of material into one or more feed boxes of a binder jetting additive manufacturing device, depositing a layer of the mixture of material into a working chamber of the binder jetting additive manufacturing device, applying a coating to the layer of the mixture of material, and curing the coating applied to the layer of the mixture of material to form a portion of a veneer product, actuating a working surface of the working chamber, depositing an additional layer of the mixture of material into the working chamber, applying an additional coating to the additional layer of the mixture of material, and curing the additional coating applied to the additional layer of the mixture of material to form an additional portion of the veneer product.

16 Claims, 5 Drawing Sheets

(51) Int. Cl.
 *B29C 64/255* (2017.01)
 *B33Y 10/00* (2015.01)

(56) References Cited

U.S. PATENT DOCUMENTS

| | | | |
|---|---|---|---|
| 8,608,898 | B2 | 12/2013 | Tagliabue |
| 2015/0079213 | A1* | 3/2015 | Shi ........................ B29C 64/209 |
| | | | 425/130 |
| 2016/0158962 | A1* | 6/2016 | Balistreri .................. B32B 5/16 |
| | | | 428/548 |
| 2016/0271879 | A1 | 9/2016 | Yamashita et al. |
| 2017/0326790 | A1* | 11/2017 | Lee ........................ B33Y 10/00 |
| 2018/0009127 | A1 | 1/2018 | Gehrer et al. |
| 2019/0194462 | A1 | 6/2019 | Heikkila et al. |

FOREIGN PATENT DOCUMENTS

| | | |
|---|---|---|
| EP | 2855117 B1 | 7/2018 |
| WO | 2018127276 A1 | 7/2018 |
| WO | 2019199893 A1 | 10/2019 |

\* cited by examiner

BINDER JETTING ADDITIVE MANUFACTURING FOR VENEER APPLICATIONS

BACKGROUND

Consumers in the aviation or automotive industry may require matching veneer in sheet or core form across a purchased lineup or fleet of vehicles (e.g., airplanes, automobiles, or like). In the case of natural lumber, a color, design, grain width, and/or grain pattern for a particular veneer may be different, whether manufactured from lumber of different species or lumber from the same species. In some cases, only one log out of thousands may meet industry requirements, meaning the use of the particular veneer for installed panels and/or spare panels may be largely limited to an amount of square footage the log provides. As such, matching veneer manufactured from natural lumber in sheet or core form may be difficult.

SUMMARY

A method of binder jetting additive manufacturing for veneer applications is disclosed, in accordance with one or more embodiments of the disclosure. The method may include, but is not limited to, loading a mixture of material into one or more feed boxes of a binder jetting additive manufacturing device. The mixture of material may include wood product. The method may include, but is not limited to, depositing a layer of the mixture of material into a working chamber of the binder jetting additive manufacturing device. The method may include, but is not limited to, applying a coating to the layer of the mixture of material. The method may include, but is not limited to, curing the coating applied to the layer of the mixture of material to form a portion of a veneer product.

In some embodiments, the veneer product may include a sheet of veneer formed from the layer of the mixture of material.

In some embodiments, the method may include, but is not limited to, actuating a working surface of the working chamber. The method may include, but is not limited to, depositing an additional layer of the mixture of material into the working chamber of the binder jetting additive manufacturing device to form an additional portion of the veneer product.

In some embodiments, the veneer product may include a veneer block at least formed from the layer of the mixture of material and the additional layer of the mixture of material. The veneer block may be at least one of compressed or heated within the binder jetting additive manufacturing device.

In some embodiments, the veneer product may include a three-dimensional veneer structure at least formed from the layer of the mixture of material and the additional layer of the mixture of material.

In some embodiments, the method may include, but is not limited to, applying an additional coating to the additional layer of the mixture of material. The method may include, but is not limited to, curing the additional coating applied to the additional layer of the mixture of material to form the additional portion of the veneer product.

In some embodiments, at least one of the coating or the mixture of material may include a binder.

In some embodiments, the binder may be a thermoplastic.

In some embodiments, the binder may be an adhesive.

In some embodiments, at least one of the coating or the mixture of material may include a coating selected to generate at least one of a particular color, design, grain width, or grain pattern.

In some embodiments, the mixture of material may include at least one of a fire-retardant or a fire-resistant material.

In some embodiments, the mixture of material may include a metal.

A method of binder jetting additive manufacturing for veneer applications is disclosed, in accordance with one or more embodiments of the disclosure. The method may include, but is not limited to, loading a mixture of material into one or more feed boxes of a binder jetting additive manufacturing device. The mixture of material may include wood product. The method may include, but is not limited to, depositing a layer of the mixture of material into a working chamber of the binder jetting additive manufacturing device. The method may include, but is not limited to, actuating a working surface of the working chamber. The method may include, but is not limited to, depositing an additional layer of the mixture of material into the working chamber of the binder jetting additive manufacturing device to form an additional portion of the veneer product.

In some embodiments, the method may include, but is not limited to, applying a coating to the layer of the mixture of material. The method may include, but is not limited to, curing the coating applied to the layer of the mixture of material to form the first portion of the veneer product.

In some embodiments, the method may include, but is not limited to, applying an additional coating to the additional layer of the mixture of material. The method may include, but is not limited to, curing the additional coating applied to the additional layer of the mixture of material to form the additional portion of the veneer product.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are examples and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION OF THE INVENTION

Reference will now be made in detail to the subject matter disclosed, which is illustrated in the accompanying drawings.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of sub-combination of two or more such features, along with any other features which may not necessarily be expressly described or inherently present in the instant disclosure.

FIGS. 1-5 generally illustrate binder jetting additive manufacturing for veneer applications, in accordance with one or more embodiments of the disclosure.

With natural veneer, lumber may be cut from trees of the same species or different species. However, the trees may be located in numerous places around the world, which may result in variances of color, design, grain width, and/or grain pattern within the lumber. In some cases, only one log out of thousands may meet industry requirements, meaning the use of the particular veneer for installed panels and/or spare panels may be largely limited to an amount of square footage the log provides.

With composite veneer, a tree may be broken down and meshed into a block with the addition of color. Current methods of generating composite veneer, while more likely to match across different sources than natural veneer, may be cost-prohibitive in terms of long lead time and/or the size of the bulk order that may be required.

As such, it would be beneficial to use binder jetting additive manufacturing for veneer applications to produce veneer products, the veneer products including matching color, design, grain width, and grain pattern from fabricated veneer. The fabricated veneer may address or offset the possibility of variances within the natural veneer. The fabricated veneer may be cut to custom size for the veneer products in a more cost-effective manner than the composite veneer.

Figure 1:
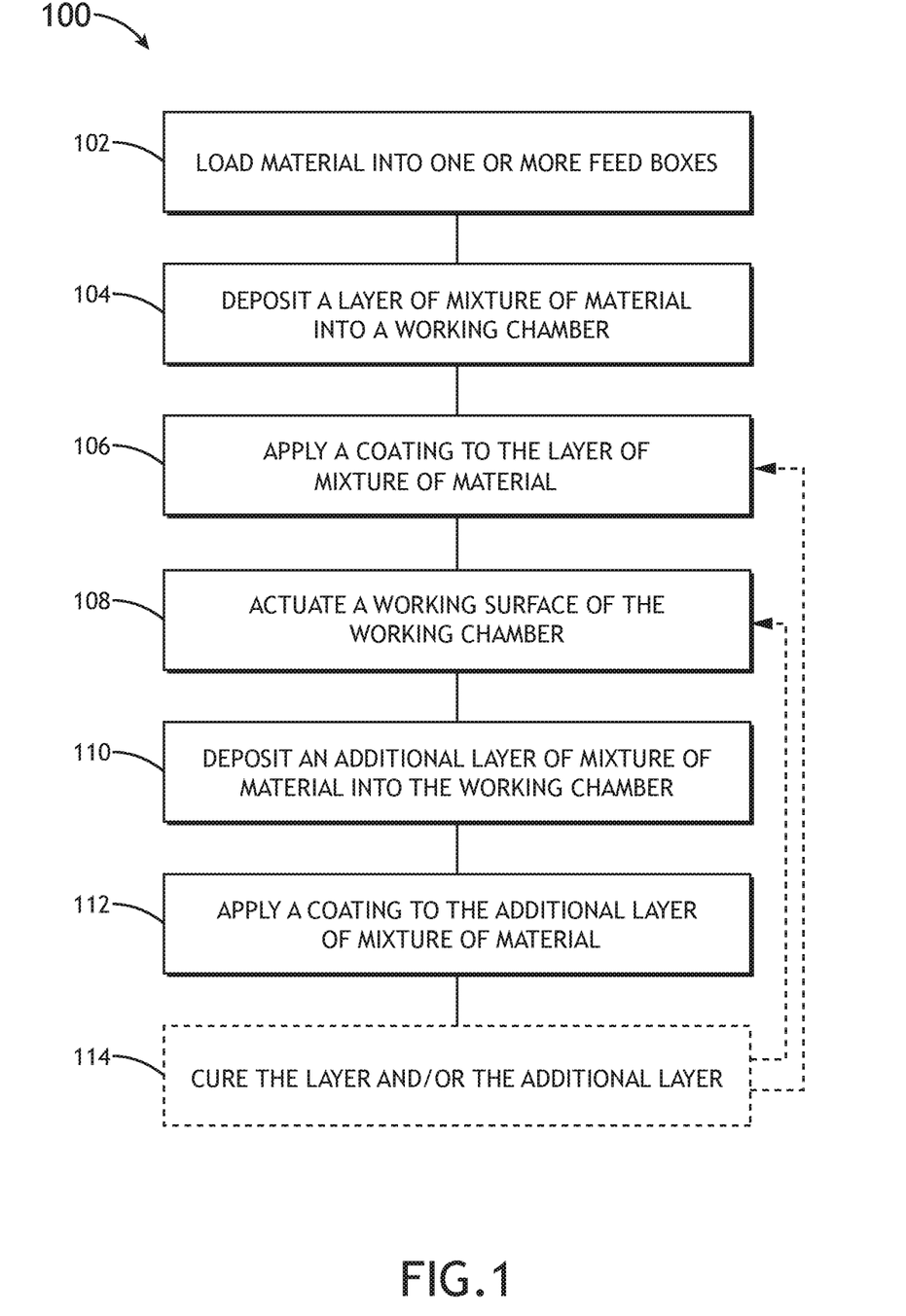
FIG. 1 is a flow diagram illustrating a method or process of binder jetting additive manufacturing for veneer applications, in accordance with one or more embodiments of the disclosure.
Figure 2:
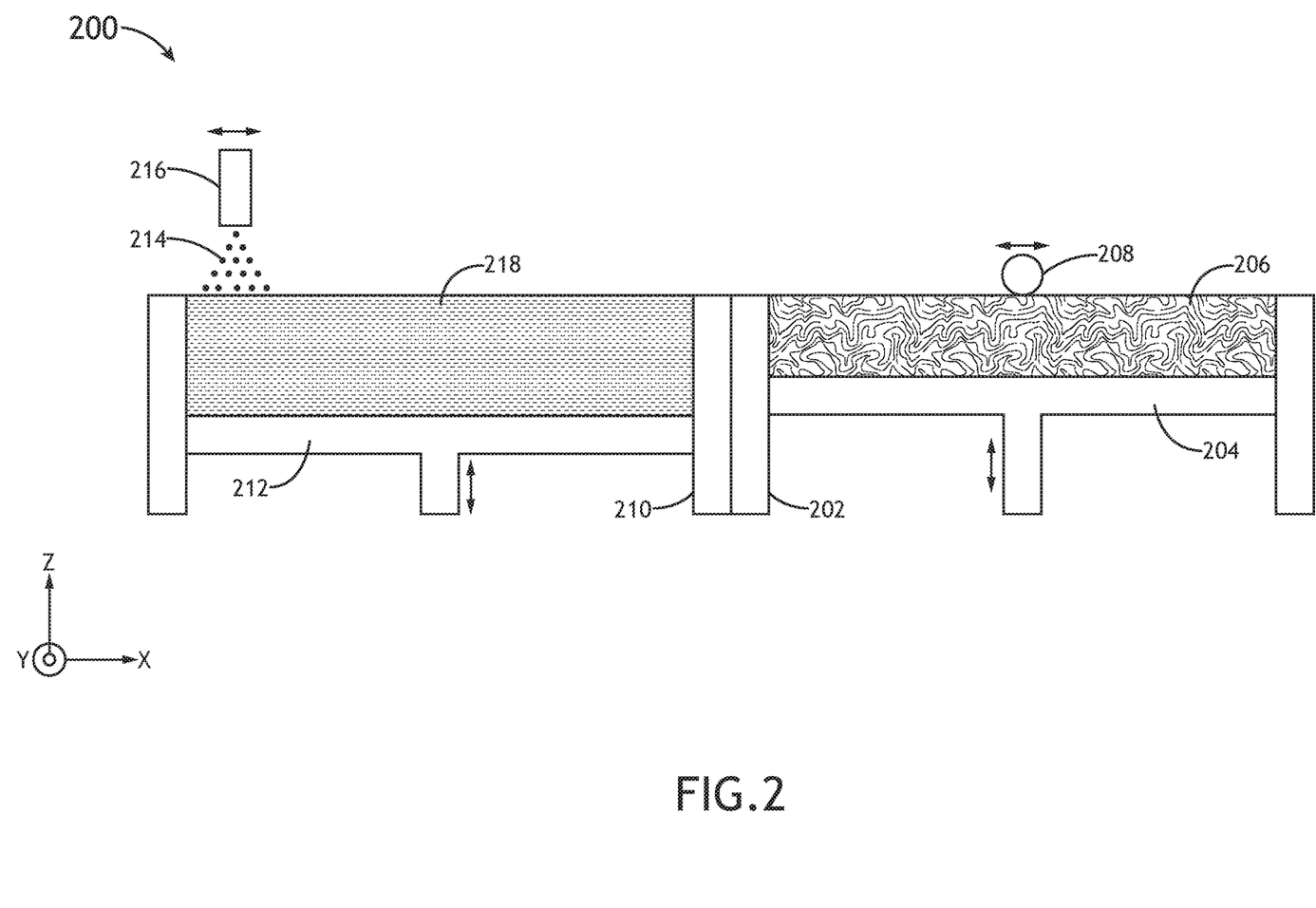
FIG. 2 illustrates a binder jetting additive manufacturing device for veneer applications, in accordance with one or more embodiments of the disclosure.
Figure 3:
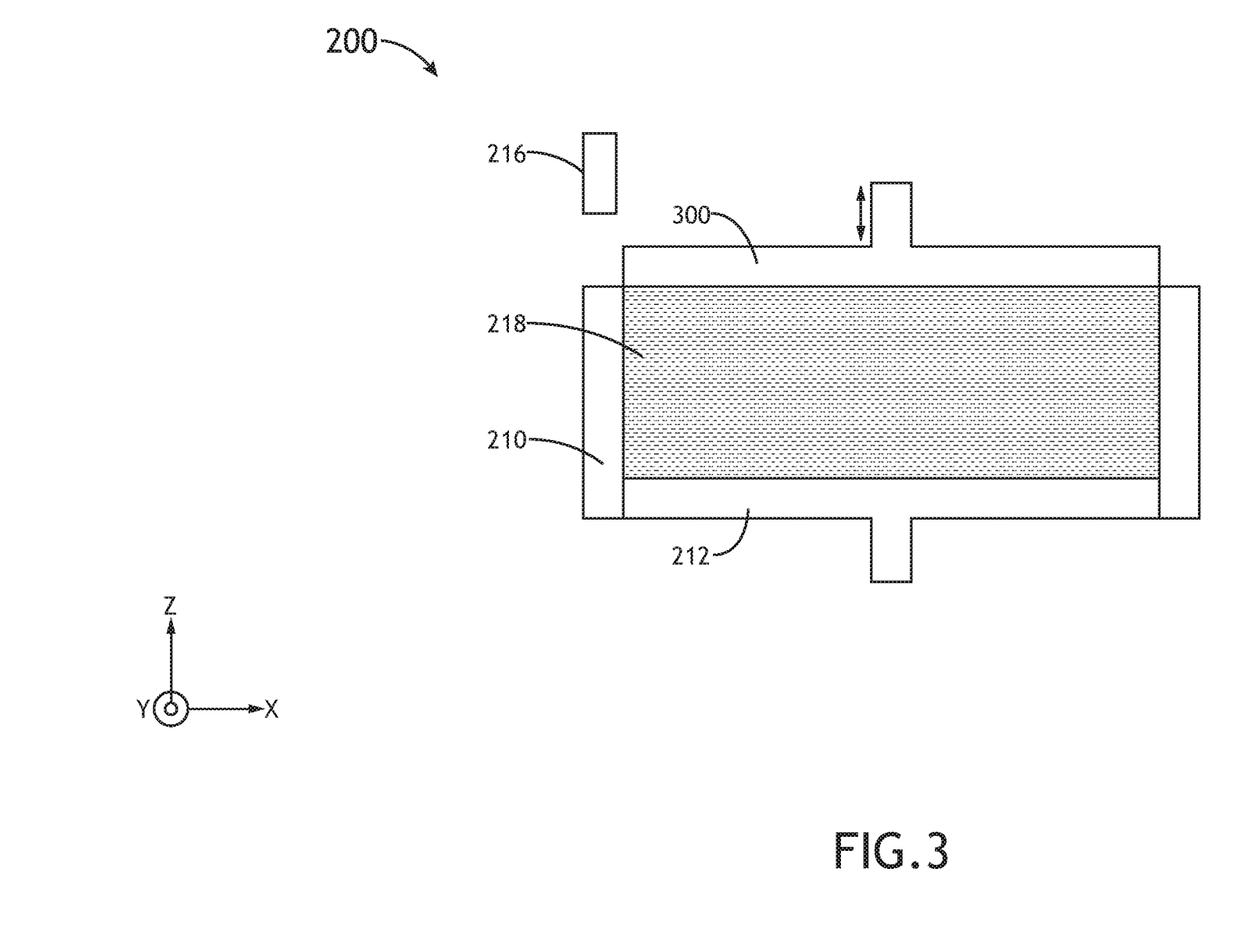
FIG. 3 illustrates a binder jetting additive manufacturing device for veneer applications, in accordance with one or more embodiments of the disclosure.
Figure 4A:
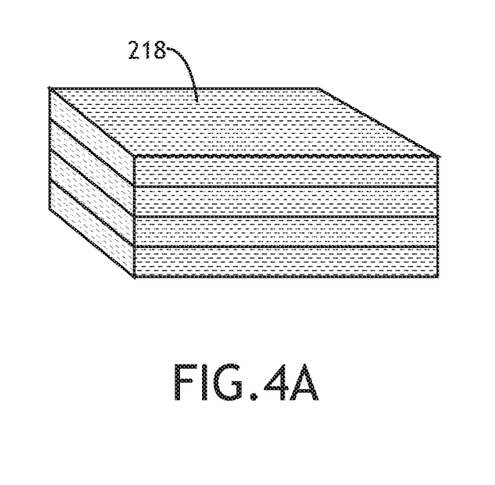
FIG. 4A is a veneer product fabricated with binder jetting additive manufacturing, in accordance with one or more embodiments of the disclosure.
Figure 4B:
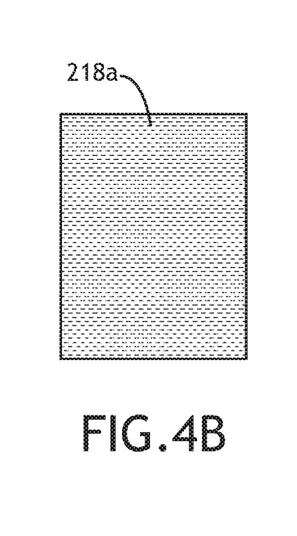
FIG. 4B is a veneer product fabricated with binder jetting additive manufacturing, in accordance with one or more embodiments of the disclosure.
Figure 4C:
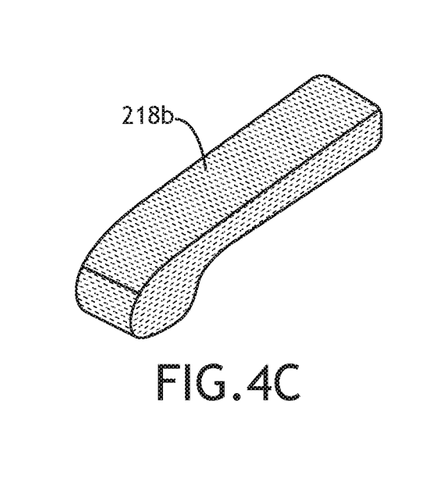
FIG. 4C is a veneer product fabricated with binder jetting additive manufacturing, in accordance with one or more embodiments of the disclosure.

FIG. 1 is a flow diagram illustrating a method or process 100 of binder jetting additive manufacturing for veneer applications, in accordance with one or more embodiments of the disclosure. FIGS. 2 and 3 illustrate a binder jetting additive manufacturing device 200 for veneer applications, in accordance with one or more embodiments of the disclosure. FIGS. 4A-4C illustrate veneer products fabricated from binder jetting additive manufacturing, in accordance with one or more embodiments of the present disclosure.

In a step 102, material may be loaded into one or more feed boxes. The binder jetting additive manufacturing device 200 may include one or more feed boxes 202. The one or more feed boxes 202 may be configured to hold material 204 (or a mixture of material).

The material 204 may include raw wood product (e.g., sawdust, wood shavings, wood pulp, or other wood product). For example, the raw wood product may be from the same source. By way of another example, the raw wood product may be from different sources. For instance, the raw wood product may be from different species of tree. In addition, the raw wood product may be from different batches of the same species of tree.

The material 204 may include a binder (or binding agent). The binder may include, but is not limited to, a thermoplastic or an adhesive. The adhesive may include, but is not limited to, an epoxy resin, a wood glue, or other adhesive suitable for use with wood. For example, the epoxy resin may include a clear epoxy resin that is not visible in the stack of lumber once dry. For instance, the use of an epoxy resin may allow for the color of the sheets of veneer to be replicated throughout the stack of lumber, without concern of unwanted color (e.g., a white or yellow layer). By way of another example, the epoxy resin may be a two-part epoxy resin. The adhesive may be in a powder, particle, and/or particulate form to mix with the wood product.

The material 204 may include a thermal-sensitive material. The thermal-sensitive material may be configured to activate (e.g., in the presence of heat) and generate a particular color, design, grain width, and/or grain pattern.

The thermal-sensitive material may be in a powder, particle, and/or particulate form to mix with the wood product.

The material 204 may include a fire-resistant and/or fire-retardant material. For example, the fire-resistant and/or fire-retardant material may include, but is not limited to, metal powder, metal particles, metal shavings, or other metal product. By way of another example, the fire-resistant and/or fire-retardant material may include, but is not limited to, a concrete, a silicate (e.g., a material with a chemical compound including $SiO_2$ structures), or another material with one or more fire-resistant and/or fire-retardant properties.

The binder jetting additive manufacturing device 200 may include one or more primary feed boxes 202 and one or more mixing chambers or secondary feed boxes 202. For example, the binder jetting additive manufacturing device 200 may be configured to determine a select mixture of material from the one or more primary feed boxes 202, and receive and mix the select material into a mixture within a mixing chamber or secondary feed box 202. It is noted herein, however, that the binder jetting additive manufacturing device 200 may include one or more feed boxes 202 configured to receive a pre-mixed mixture of material. Therefore, the description should not be interpreted as a limitation on the scope of the disclosure but merely an illustration.

In a step 104, a layer of material (or mixture of material) may be deposited into a working chamber. The one or more feed chambers or boxes 202 may include an actuatable feed surface 206. For example, the actuatable feed surface 206 may be configured to actuate in one or more directions along one or more axes. For instance, the actuatable feed surface 206 may be configured to actuate in a direction along a z-axis. In one example, the actuatable feed surface 206 may be configured to raise a distance selected to push an amount of material 204 necessary to form a layer of material 204. The actuatable feed surface 206 may reposition material 204 within the one or more feed boxes 202. For example, the actuatable feed surface 206 may translate upward, pushing material 204 within a pathway of an actuatable block or roller 208.

The actuatable block or roller 208 may remove the material 204 pushed upward by the actuatable feed surface 206 (e.g., by scraping the material, pushing the material, or the like), such that the material 204 may be deposited into a working chamber 210 with an actuatable working surface 212. For example, the actuatable block or roller 208 may be configured to actuate in one or more directions along one or more axes. For instance, the actuatable block or roller 208 may be configured to actuate in a direction along an x-axis.

In a step 106, a coating may be applied to the layer of material (or mixture of material). The binder jetting additive manufacturing device 200 may include one or more printheads 214. The one or more printheads 214 may be configured to apply a coating 216 on the layer of material 204 deposited within the working chamber 210.

The coating 216 may include a binder 216. The binder 216 may include, but is not limited to, a thermoplastic, an adhesive, and/or water. The adhesive may include, but is not limited to, an epoxy resin, a wood glue, or other adhesive suitable for use with wood. For example, the epoxy resin may include a clear epoxy resin that is not visible in the stack of lumber once dry. For instance, the use of an epoxy resin may allow for the color of the sheets of veneer to be replicated throughout the stack of lumber, without concern of unwanted color (e.g., a white or yellow layer). By way of another example, the epoxy resin may be a two-part epoxy resin. It is noted herein the adhesive may be in a spray, liquid, or solid (e.g., powder, particle, and/or particulate) form to at least partially cover the layer of material 204.

Where the layer of material 204 includes binder, the binder included in the layer of material 204 may be similar to or different from the applied binder 216. It is noted herein, however, that the layer of material 204 may not include binder (e.g., may only include wood product, a thermal-sensitive material, a fire-resistant and/or fire-retardant material, or the like) where the printhead 214 applies binder 216 to the layer of material 204.

The coating 216 may be a coating selected to generate a particular color, design, grain width, and/or grain pattern. For example, the coating 216 may include a dyed water-based ink 216. By way of another example, the coating 216 may include a thermal-sensitive coating 216. For example, the thermal-sensitive coating may be a chemical coating configured to activate (e.g., in the presence of heat) and generate a particular color, design, grain width, and/or grain pattern.

Where the layer of material 204 includes a thermal-sensitive material, the thermal-sensitive material in the layer of material 204 may be similar to or different from the applied thermal-sensitive coating 216. It is noted herein, however, that the layer of material 204 may not include thermal-sensitive material (e.g., may only include wood product, a binder, a fire-resistant and/or fire-retardant material, or the like) where the printhead 214 applies the thermal-sensitive coating 216 to the layer of material 204.

In a step 108, a working surface of the working chamber may be actuated. The actuatable working surface 212 may actuate to reposition the layer of material within the working chamber 210 following application of the binder 216. For example, the actuatable working surface 212 may be configured to actuate in one or more directions along one or more axes. For instance, the actuatable working surface 212 may be configured to actuate in a direction along a z-axis. In one example, the actuatable working surface 212 may be configured to lower a distance approximately equal to a thickness of a layer of material 204.

In a step 110, an additional layer of the material (or mixture of material) may be deposited into the working chamber. The actuatable feed surface 206 may reposition additional material 204 within the one or more feed boxes 202. For example, the actuatable feed surface 206 may translate upward, pushing additional material 204 within the pathway of the actuatable block or roller 208. The actuatable block or roller 208 may remove the additional material 204 pushed upward by the actuatable feed surface 206 (e.g., by scraping the material, pushing the material, or the like), such that the additional material 204 may be deposited into the working chamber 210.

In a step 112, a coating may be applied to the additional layer of material (or mixture of material). The one or more printheads 214 may be configured to apply the coating 216 on the additional layer of material deposited within the working chamber 210.

The coating 216 may include the binder 216. Where the additional layer of material 204 includes binder, the binder included in the additional layer of material 204 may be similar to or different from the applied binder 216. It is noted herein, however, that the additional layer of material 204 may not include binder (e.g., may only include wood product, a thermal-sensitive material, a fire-resistant and/or fire-retardant material, or the like) where the printhead 214 applies binder 216 to the additional layer of material 204.

The coating 216 may include the coating selected to generate a particular color, design, grain width, and/or grain pattern (e.g., a dyed water-based ink 216, a thermal-sensitive coating 216, or the like). Where the additional layer of material 204 includes a thermal-sensitive material, the thermal-sensitive material in the additional layer of material 204 may be similar to or different from the applied thermal-sensitive coating 216. It is noted herein, however, that the additional layer of material 204 may not include thermal-sensitive material (e.g., may only include wood product, a binder, a fire-resistant and/or fire-retardant material, or the like) where the printhead 214 applies the thermal-sensitive coating 216 to the additional layer of material 204.

It is noted herein that the coating 216 may be applied to each successive layer of material deposited in the working chamber 210 (e.g., as deposited in step 104 and/or step 110 of the process 100). It is noted herein, however, that multiple layers of material 204 may be deposited within the working chamber 210 before the coating 216 is applied to the multiple layers of material 204 (e.g., step 104 and step 110 occur before the applying of a coating in step 112 of process 100). Therefore, the description should not be interpreted as a limitation on the scope of the disclosure but merely an illustration.

The depositing and/or binding of the layer of material 204 and/or the additional layer of material 204 may form at least a portion of a veneer product 218. For example, as illustrated in FIG. 4A, the veneer product 218 may be a veneer block or core 218. By way of another example, as illustrated in FIG. 4B, the veneer product 218 may include a sheet of veneer 218a. By way of another example, as illustrated in FIG. 4C, the veneer product 218 may include a shaped three-dimensional structure 218b. The veneer product 218 may include a particular color, design, grain width, and/or grain pattern.

In an optional step 114, the layer of material and/or the additional layer of material may be cured. Where the coating 216 includes the binder 216, the binder 216 may be applied to the layer of material 204 and/or the additional layer of material 204 at an increased temperature, such that the binder 216 may cure as it cools to form the veneer product 218. The binder 216 may be applied at or below a room operating temperature, and the applied binder 216 may subsequently be activated (e.g., via heat, pressure, a combination of heat and pressure, a chemical reaction, or the like).

As illustrated in FIG. 3, the activating of the binder 216 may be accomplished by one or more actuatable plates 300 of the binder jetting additive manufacturing device 200. For example, the one or more actuatable plates 300 may be configured to actuate in one or more directions along one or more axes. For instance, the one or more actuatable plates 300 may be configured to translate along a y-axis. The one or more actuatable plates 300 may compress and/or heat the veneer product 218. It is noted herein, however, that the compression and/or heating of the veneer product 218 may only be necessary where the veneer product is a veneer block or core (e.g., as illustrated in FIG. 4A), and that the sheet of veneer 218a (e.g., as illustrated in FIG. 4B) and/or the three-dimensional structure 218b (e.g., as illustrated in FIG. 4C) may not require compression and/or heating. Therefore, the description should not be interpreted as a limitation on the scope of the disclosure but merely an illustration.

Although embodiments of the disclosure illustrate the binder 216 being activated within the working chamber 210 of the binder jetting additive manufacturing device 200, it is noted herein the activating of the binder 216 may be accomplished in a separate location from the working chamber 210 of the binder jetting additive manufacturing device 200. For example, the binder 216 may be activated with a heat source (e.g., a heat lamp, or the like) in a curing chamber separate from the working chamber 210 of the binder jetting additive manufacturing device 200. For instance, the curing chamber may be a different chamber of the binder jetting additive manufacturing device 200. In addition, the curing chamber may be separate from the binder jetting additive manufacturing device 200. Therefore, the description should not be interpreted as a limitation on the scope of the disclosure but merely an illustration.

It is noted herein the step 114 may occur at any time during the process 100. For example, no curing of layers may occur until after all layers have been fed, such that the step 114 may occur as a single step after a final iteration of step 112 (or the single iteration of step 106). Therefore, the description should not be interpreted as a limitation on the scope of the disclosure but merely an illustration.

Although embodiments of the present disclosure illustrate the depositing of multiple layers of material 204 (or mixture of material) within the working chamber 210, it is noted herein that only a single layer of material 204 may be deposited within the working chamber 210 (e.g., step 106 proceeds straight to step 114 of the process 100). For example, as illustrated in FIG. 4B, only a single layer of material 204 may be necessary to form the sheet of veneer 218a. Therefore, the description should not be interpreted as a limitation on the scope of the disclosure but merely an illustration.

It is noted herein the step 114 may be considered optional. For example, there may be no other layers to which to bind the layer of material 204, where the layer of material 204 is the layer deposited into the working chamber 210. By way of another example, it may not be desirable to bind the layer of material 204 and the additional layer of material 204 prior to the feeding of a subsequent layer of material 204. Therefore, the description should not be interpreted as a limitation on the scope of the disclosure but merely an illustration.

In a step of the process 100, the veneer product 218 may be firetreated. For example, the veneer product 218 may be treated with a fire-resistant and/or fire-retardant material. By way of another example, the veneer product 218 may be treated with fire. Where the veneer product 218 is a single sheet of veneer 218a or a three-dimensional structure 218b, the veneer product 218 may be firetreated as a single component. Where the veneer product 218 includes multiple sheets of veneer 218a, each sheet of veneer may be firetreated individually, in batches, or in bulk. It is noted herein, however, that where the generated mixture used to fabricate a veneer product 218 includes a heat-sensitive compound such as a thermoplastic, that firetreating may alter (e.g., re-melt, re-cure, or the like) the heat-sensitive compound.

Some or all of the method or process 100 may be repeated until a complete veneer product 218 is formed from the material 204. For example, following the step 114, the process 100 may return to step 108 where the working surface 212 is actuated before performing one or more of steps 110, 112, and/or 114.

In a step of the process 100, a coating may be applied to the complete veneer product 218. For example, the coating may include an infiltrant, a sealant, or other coating configured to protect the complete veneer product 218. For instance, the infiltrant may include an adhesive configured to fill in pores, gaps, cracks, or other imperfections that may reduce the strength of the complete veneer product 218.

It is noted herein the process 100 is not limited to the steps and/or sub-steps provided. The process 100 may include more or fewer steps and/or sub-steps. The process 100 may perform the steps and/or sub-steps simultaneously. The process 100 may perform the steps and/or sub-steps sequentially, including in the order provided or an order other than provided. Therefore, the above description should not be interpreted as a limitation on the scope of the disclosure but merely an illustration.

In this regard, a veneer product 218 with a selected color, design, grain width, and/or grain pattern may be digitally designed without being reliant upon natural resources and/or a limited supply. The veneer product 218 may include a color, design, grain width, and/or grain pattern recreated based on a veneer selected or provided by a user (e.g., a consumer, manufacturer, or other individual involved with the selection of the veneer being sequenced). The veneer product may be repeatably fabricated to ensure a consistency of a component aesthetic mass-produced for, disseminated for, and/or installed within a vehicle (e.g., an aircraft, an automobile, or the like). The ability to repeatably fabricate the veneer product 218 may allow for the repair and/or replacement of an original product with an exact duplicate of the original product. The ability to repeatably fabricate the veneer product 218 may result in bulk production, production on demand, the ability to maintain a digital inventory, and/or potential cost savings (e.g., in the form of material collection and use, or the like).

Figure 5:
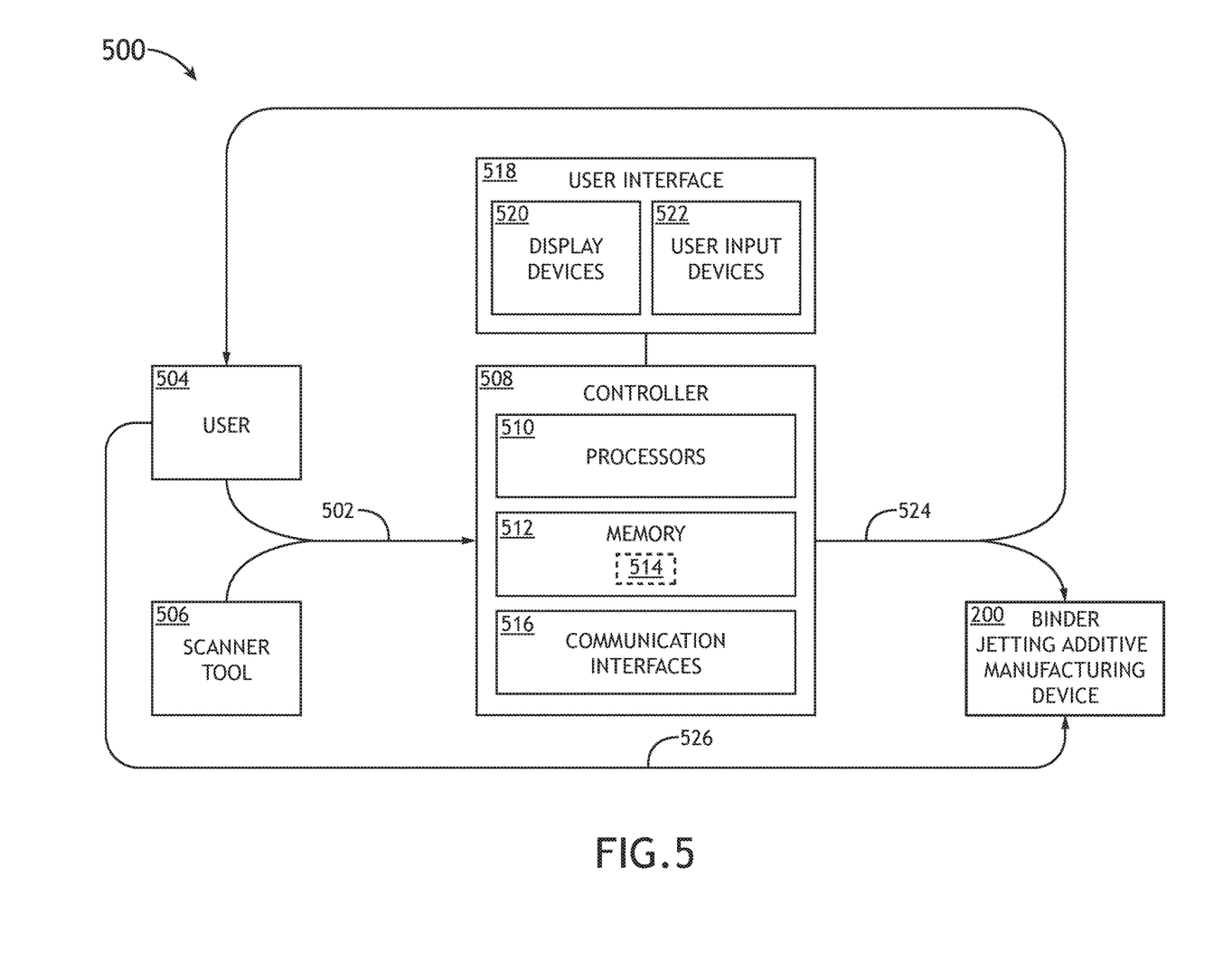
FIG. 5 illustrates a system used for binder jetting additive manufacturing for veneer applications, in accordance with one or more embodiments of the disclosure.

FIG. 5 illustrates a system 500 used for binder jetting additive manufacturing for veneer applications, in accordance with one or more embodiments of the present disclosure.

A set of data 502 may be transmitted through the system 500. The set of data 502 may include data defining a particular color, design, grain pattern, and/or grain width for veneer of the veneer product 218. The set of data 502 may be received from a user 504. For example, the user 504 may include a consumer, a manufacturer, or other individual involved with the selection of the veneer of the veneer product 218. It is noted herein the set of data 502 may be received by the one or more controllers 508 either directly or indirectly (e.g., through an intermediary, where the consumer passes the set of data 502 to the manufacturer and the manufacturer uploads the data).

The set of data 502 may be received from a scanning tool 506. For example, where the veneer product 218 needs to match a previously-used and/or installed veneer product 218 in a vehicle (e.g., airplane, automobile, or the like), the color, design, grain width, and/or grain pattern of the veneer of the veneer product 218 may be scanned with a scanning tool 506 to generate the set of data 502.

The set of data 502 may be received by one or more controllers 508. The one or more controllers 508 may include at least one of one or more processors 510, memory 512 configured to store one or more sets of program instructions 514, and/or one or more communication interfaces 516.

The one or more processors 510 provides processing functionality for at least the one or more controllers 508 and may include any number of processors, micro-controllers, circuitry, field programmable gate array (FPGA) or other processing systems, and resident or external memory for storing data, executable code, and other information accessed or generated by the one or more controllers 508. The one or more processors 510 may execute one or more software programs (e.g., the one or more sets of program instructions 514) embodied in a non-transitory computer readable medium (e.g., the memory 512) that implement techniques described herein. The one or more processors 510 are not limited by the materials from which it is formed or the processing mechanisms employed therein and, as such, may be implemented via semiconductor(s) and/or transistors (e.g., using electronic integrated circuit (IC) components), and so forth.

The memory 512 may be an example of tangible, computer-readable storage medium that provides storage functionality to store various data and/or program code associated with operation of the one or more controllers 508 and/or one or more processors 510, such as software programs and/or code segments, or other data to instruct the one or more processors 510 and/or other components of the one or more controllers 508, to perform the functionality described herein. Thus, the memory 512 may store data, such as a program of instructions for operating the one or more controllers 508, including its components (e.g., one or more processors 510, the one or more communication interfaces 516, or the like), and so forth. It should be noted that while a single memory 512 is described, a wide variety of types and combinations of memory (e.g., tangible, non-transitory memory) may be employed. The memory 512 may be integral with the one or more processors 510, may include stand-alone memory, or may be a combination of both. Some examples of the memory 512 may include removable and non-removable memory components, such as random-access memory (RAM), read-only memory (ROM), flash memory (e.g., a secure digital (SD) memory card, a mini-SD memory card, and/or a micro-SD memory card), solid-state drive (SSD) memory, magnetic memory, optical memory, universal serial bus (USB) memory devices, hard disk memory, external memory, and so forth.

The one or more controllers 508 may be configured to perform one or more process steps, as defined by the one or more sets of program instructions 514. The one or more process steps may be performed iteratively, concurrently, and/or sequentially. The one or more sets of program instructions 514 may be configured to operate via a control algorithm, a neural network (e.g., with states represented as nodes and hidden nodes and transitioning between them until an output is reached via branch metrics), a kernel-based classification method, a Support Vector Machine (SVM) approach, canonical-correlation analysis (CCA), factor analysis, flexible discriminant analysis (FDA), principal component analysis (PCA), multidimensional scaling (MDS), principal component regression (PCR), projection pursuit, data mining, prediction-making, exploratory data analysis, supervised learning analysis, boolean logic (e.g., resulting in an output of a complete truth or complete false value), fuzzy logic (e.g., resulting in an output of one or more partial truth values instead of a complete truth or complete false value), or the like. For example, in the case of a control algorithm, the one or more sets of program instructions 514 may be configured to operate via proportional control, feedback control, feedforward control, integral control, proportional-derivative (PD) control, proportional-integral (PI) control, proportional-integral-derivative (PID) control, or the like.

The one or more communication interfaces 516 may be operatively configured to communicate with components of the one or more controllers 508. For example, the one or more communication interfaces 516 may be configured to retrieve data from the one or more processors 510 or other devices, transmit data for storage in the memory 512, retrieve data from storage in the memory 512, and so forth. The one or more communication interfaces 516 may also be coupled (e.g., physically, electrically, and/or communicatively) with the one or more processors 510 to facilitate data transfer between components of the one or more controllers 508 and the one or more processors 510. It should be noted that while the one or more communication interfaces 516 is described as a component of the one or more controllers 508, one or more components of the one or more communication interfaces 516 may be implemented as external components coupled (e.g., physically, electrically, and/or communicatively) to the one or more controllers 508 via a wired and/or wireless connection. The one or more controllers 508 may also include and/or connect to one or more input/output (I/O) devices. In some embodiments, the one or more communication interfaces 516 includes or is coupled (e.g., physically, electrically, and/or communicatively) to a transmitter, receiver, transceiver, physical connection interface, or any combination thereof.

The one or more controllers 508 may be coupled (e.g., physically, electrically, and/or communicatively) to one or more user interfaces 518. The one or more user interfaces 518 may include and/or be configured to interact with one or more display devices 520. The one or more user interfaces 518 may include and/or be configured to interact with one or more user input devices 522.

The one or more communication interfaces 516 may be operatively configured to communicate with one or more user interfaces 518. The one or more controllers 508 and the one or more user interfaces 518 may be separate components (e.g., have separate housings and/or separate chassis). It is noted herein, however, that the one or more controllers 508 and the one or more user interfaces 518 may be components integrated in a single housing and/or on a single chassis.

The one or more display devices 520 may include any display device known in the art. For example, the one or more display devices 520 may include, but are not limited to, a liquid crystal display (LCD), a light-emitting diode (LED) display, an organic light-emitting diode (OLED) based display, or the like. Those skilled in the art should recognize that a variety of display devices 520 may be suitable for implementation in the disclosure and the particular choice of display device may depend on a variety of factors, including, but not limited to, form factor, cost, and the like. In a general sense, any display device capable of integration with the one or more user input devices 522 (e.g., touchscreen, bezel mounted interface, keyboard, mouse, trackpad, and the like) is suitable for implementation in the disclosure.

The one or more user input devices 522 may include any data input device known in the art. For example, the one or more user input devices 522 may include, but are not limited to, a keyboard, a keypad, a touchscreen, a lever, a knob, a scroll wheel, a track ball, a switch, a dial, a sliding bar, a scroll bar, a slide, a touch pad, a paddle, a steering wheel, a joystick, a button, a bezel input device or the like. In the case of a touchscreen interface, those skilled in the art should recognize that a large number of touchscreen interfaces may be suitable for implementation in the disclosure. For instance, a display device may be integrated with a touchscreen interface, such as, but not limited to, a capacitive touchscreen, a resistive touchscreen, a surface acoustic based touchscreen, an infrared based touchscreen, or the like. In a general sense, any touchscreen interface capable of integration with the display portion of a display device is suitable for implementation in the disclosure.

The one or more communication interfaces 516 may be operatively configured to communicate with components of the scanning tool 506.

The one or more communication interfaces 516 may be operatively coupled (e.g., physically, electrically, and/or communicatively) with components of the binder jetting additive manufacturing device 200. For example, the one or more controllers 508 may be configured to adjust one or more operational parameters 524 for the binder jetting additive manufacturing device 200. For instance, the one or more operational parameters 524 may include operational parameters for the one or more actuatable feed surface 206, the actuatable block or roller 208, the actuatable working surface 212, the one or more printheads 214, and/or the actuatable plate 300, as illustrated in FIGS. 2 and 3, or other components of the binder jetting additive manufacturing device 200 (e.g., actuation speed, actuation direction along an axis and/or within a plane, position within or proximate to the binder jetting additive manufacturing device 200, or the like).

Although embodiments of the present disclosure illustrate the one or more controllers 508 as adjusting the one or more operational parameters of the binder jetting additive manufacturing device 200, it is noted herein the one or more operational parameters 524 may be adjusted via manual controls or manual instructions 526 from the user 504. Therefore, the description should not be interpreted as a limitation on the scope of the disclosure but merely an illustration.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed:
1. A method of binder jetting additive manufacturing for veneer applications, comprising:
   scanning a grain pattern of a veneer;
   transmitting data based on the scanning of the grain pattern;
   receiving the transmitted data;
   selecting a grain pattern for a veneer block based on the transmitted data;
   loading a mixture of material into one or more feed boxes of a binder jetting additive manufacturing device, the mixture of material including wood product, the mixture of the material based on the transmitted data;
   depositing a layer of the mixture of material into a working chamber of the binder jetting additive manufacturing device, the deposition of the mixture of the material based on the transmitted data;
   applying a coating to the layer of the mixture of material via a printhead;
   curing the coating applied to the layer of the mixture of material to form a portion of a veneer product;
   actuating a working surface of the working chamber;
   depositing an additional layer of the mixture of material into the working chamber of the binder jetting additive manufacturing device, the deposition of the additional layer of the mixture of the material based on the transmitted data;
   applying an additional coating to the additional layer of the mixture of material; and
   curing the additional coating applied to the additional layer of the mixture of material to form an additional portion of the veneer product;

heating at least one of the working surface or one or more actuation plates, wherein heating the at least one of the working surface or the one or more actuation plates causes a heating of the portion of the veneer product; and actuating the one or more actuating plates wherein an actuation of the one of more actuation plates causes a compression of the layer, forming the veneer block, wherein the grain pattern of the veneer block matches the grain pattern of the veneer.

2. The method of claim 1, the veneer product including a sheet of veneer formed from the layer of the mixture of material.

3. The method of claim 1, the veneer product including a three-dimensional veneer structure at least formed from the layer of the mixture of material and the additional layer of the mixture of material.

4. The method of claim 1, at least one of the coating or the mixture of material including a binder.

5. The method of claim 4, the binder including a thermoplastic.

6. The method of claim 4, the binder including an adhesive.

7. The method of claim 1, at least one of the coating or the mixture of material including the coating selected to generate at least one of a particular color, design, grain width, or grain pattern.

8. The method of claim 1, the mixture of material including at least one of a fire-retardant or a fire-resistant material.

9. The method of claim 8, the mixture of material including a metal.

10. The method of claim 1, wherein the transmitted data defines a color of the veneer or veneer product.

11. The method of claim 1, wherein the transmitted data defines a grain width of the veneer or veneer product.

12. The method of claim 1, wherein the transmitted data defines a grain pattern of the veneer or veneer product.

13. A method of binder jetting additive manufacturing for veneer applications, comprising:
   scanning a grain pattern of a veneer;
   transmitting data based on the scanning of the grain pattern;
   receiving the transmitted data;
   selecting a grain pattern for a veneer block based on the transmitted data;
   loading a mixture of material into one or more actuatable feed boxes of a binder jetting additive manufacturing device, the mixture of material including wood product, the mixture of the material based on the transmitted data;
   depositing a layer of the mixture of material into a working chamber of the binder jetting additive manufacturing device comprising:
      actuating the one or more actuatable feed boxes to expose a layer of the mixture; and
      pushing the mixture into the working chamber via a roller or actuatable block, wherein the deposition of the mixture of the material is based on the transmitted data;
   applying a coating to the layer of the mixture of material;
   curing the coating applied to the layer of the mixture of material to form a first portion of a veneer product;
   actuating a working surface of the working chamber;
   depositing an additional layer of the mixture of material into the working chamber of the binder jetting additive manufacturing device to form an additional portion of the veneer product, the deposition of the additional layer of the mixture of the material based on the transmitted data;
   applying an additional coating to the additional layer of the mixture of material; and
   curing the additional coating applied to the additional layer of the mixture of material to form an additional portion of the veneer product;
   heating at least one of the working surface or one or more actuation plates, wherein heating the at least one of the working surface or the one or more actuation plates causes a heating of the portion of the veneer product; and
   actuating the one or more actuating plates, wherein an actuation of the one of more actuation plates causes a compression of the layer, forming the veneer block.

14. The method of claim 13, wherein the transmitted data defines a color of the veneer or veneer product.

15. The method of claim 13, wherein the transmitted data defines a grain width of the veneer or veneer product.

16. The method of claim 13, wherein the transmitted data defines a grain pattern of the veneer or veneer product.

* * * * *